US006176888B1

(12) United States Patent
Ritt et al.

(10) Patent No.: US 6,176,888 B1
(45) Date of Patent: Jan. 23, 2001

(54) COMPOSITE CUTTING BODY, CONTAINING DIAMOND PARTICLES AND METHODS FOR ITS PRODUCTION

(75) Inventors: Walter Ritt, Schnifis (AT); Eugen Magyari, Bättwil (CH); Wolfgang Tillmann, Nüziders; Johann Dorfmeister, Feldkirch-Tisis, both of (AT); Manfred Horst Boretius, Rugell (LI)

(73) Assignee: Hilti Aktiengesellschaft, Schaan (LI)

( * ) Notice: Under 35 U.S.C. 154(b), the term of this patent shall be extended for 0 days.

(21) Appl. No.: 08/922,289

(22) Filed: Sep. 3, 1997

(30) Foreign Application Priority Data

Sep. 3, 1996 (DE) ........................................ 196 35 633

(51) Int. Cl.[7] ........................................ B24D 11/00

(52) U.S. Cl. ............................ 51/309; 125/39; 407/118; 407/119; 76/DIG. 12

(58) Field of Search ...................... 51/293, 309; 125/39; 407/118, 119; 76/DIG. 12

(56) References Cited

U.S. PATENT DOCUMENTS

Re. 26,879 5/1970 Kelso ........................................ 51/295
4,142,872 * 3/1979 Conradi ........................................ 51/309
4,378,975 * 4/1983 Tomlinson et al. .......................... 51/309
4,591,364 * 5/1986 Phaal ........................................ 51/309
4,956,238 * 9/1990 Griffin ........................................ 428/408
5,186,724 2/1993 Sartor ........................................ 51/293

FOREIGN PATENT DOCUMENTS 0046374 2/1882 (EP) .
0012631 6/1980 (EP) .
0198653 10/1986 (EP) .
0295151 12/1988 (EP) .
0481917 4/1992 (EP) .

OTHER PUBLICATIONS

European Search Report, No. EP 97 810 410.7 dated Dec. 19, 1997.
English Language Abstract of Japanese XP 002 049 005, 1989.
English Language Abstract of Japanese XP 002 049 006, 1987.

* cited by examiner

*Primary Examiner*—Deborah Jones
(74) *Attorney, Agent, or Firm*—Anderson, Kill & Olick, P.C.

(57) ABSTRACT

A composite cutting tool for use in the abrasive processing of hard substrates comprising cutting elements wherein diamond particles in a predominantly metallic binder material are agglomerated and sintered during an individual molding process of each of said cutting elements.

16 Claims, 1 Drawing Sheet

Figure 1:
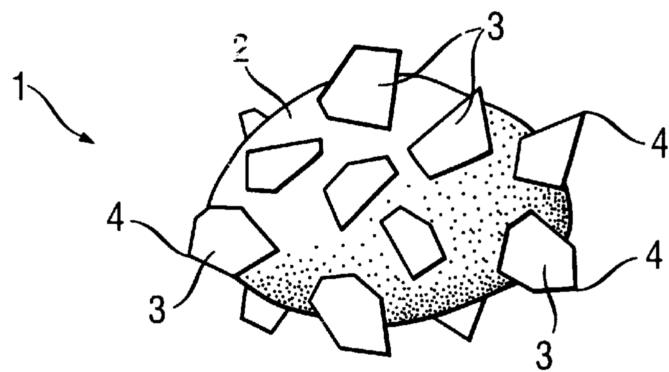

COMPOSITE CUTTING BODY, CONTAINING DIAMOND PARTICLES AND METHODS FOR ITS PRODUCTION

FIELD OF DISCOVERY

The invention relates to composite cutting bodies for abrasively processing hard materials or substrates where the cutting bodies or elements have a grain size of 400 μm to 1200 μm. Moreover, the invention also relates to a method for producing such composite cutting bodies.

BACKGROUND INFORMATION AND PRIOR ART

In many applications of working or disintegrating technology, tools are used, which have been hard-faced with diamond grains in order to improve the abrasive properties. For example, hollow drilling crowns, which are equipped at their front end with cutting segments, are used for producing boreholes or break-throughs of larger diameters. Wall saws and cutting-off wheels for cutting concrete, stone or ceramic are also hard-faced at their periphery with cutting segments. The cutting segments consist essentially of single diamond crystals, which are embedded in a metallic matrix. The grain size of the single diamond crystals, used for such cutting segments, is about 300 μm to about 600 μm. The single diamond crystals are not only disposed at the surface of the cutting segments, but are also distributed relatively uniformly over a portion of the height of the cutting segments. During the processing of the substrate, the edges of the single diamond crystals, protruding out of the surface of the matrix material, engage the material that is to be removed. If the single diamond crystals at the surface are lost, the matrix materials is worn away until new edges of single diamond crystals below are exposed.

In use, the edges can gradually become rounded or the single diamond crystals can break or fall completely out of the matrix material. Because of the relatively large grain size of the single diamond crystals, the number of effective cutting edges for the abrasive processing of the substrate is relatively small. If therefore a single diamond crystal drops out because of rounded edges or breakage or because it falls out of the matrix material, the cutting effectiveness of the cutting segments is impaired until the missing cutting edge is replaced once again by the exposure of a new single diamond crystal. This also has a disadvantageous effect on the achievable cutting speed of the cutting segment.

U.S. Pat. No. 4,591,364 discloses the use of diamond cutting bodies, which are agglomerated from diamond grains of a smaller grain size of typically about 70 μm to about 125 μm and predominantly a metallic binder material, for coating grinding disks. The mixture of diamond grains and binder material is sintered together in a sintering process to a 2-dimensional sinter cake. The 2-dimensional sinter cake is then broken up into small particles and screened. The screen fraction with an agglomerated grain size of about 149 μm to about 250 μm is used to coat the grinding disks. The breaking up of the sinter cake leads to a relatively large particle size distribution of the agglomerated composite cutting bodies, so that a not inconsiderable proportion of the agglomerates is either too large or too small for coating the grinding disks. Not only is the particle size of the rejected fractions quite different; due to the process of breaking the sinter cake, the geometric shape of the rejected fractions is also quite different There is also the danger that the fractions are damaged mechanically by the process of breaking. Therefore, at best, the rejected grain size fractions are ground further in order to be able to use them finally as grinding or polishing agents.

OBJECT OF THE INVENTION

It is an object of the present invention to provide composite cutting bodies, which have a narrow particle size distribution and also do not deviate significantly from one another with respect to their geometric shape. Waste is to be largely avoided during the further processing of the composite cutting bodies produced. The composite cutting bodies shall make it possible to produce cutting elements and cutting segments, which have a large cutting capacity, in the usual manner. It shall be possible to largely avoid losses in cutting effectiveness due to the rounding of protruding edges of the diamond grains and due to breakage or loss of diamond grains. In the event that such losses do occur, it shall be possible to compensate for them as soon as possible. It shall be possible to carry out the process of producing the composite cutting bodies as simply and as reproducibly as possible and to do so largely without mechanical damage to the composite cutting bodies due to additional breaking processes and without subsequent screening processes.

SUMMARY OF THE INVENTION

This objective is accomplished by composite cutting bodies, formed of diamond particles with a grain size in the range of 50 μm to 300 μm in a matrix of predominantly metallic binder where the cutting elements are agglomerated and sintered during an individual molding process from the mixture of diamond particles and binder material. The inventive method for their production comprises the steps forming a mixture of diamond particles in the size range of 50 μm to 300 μm and a metallic binder agglomerating the mixture into a composite, individually molding the mixture into a composite cutting element in a size range of 400 μm to about 1200 μm, and then sintering the composite cutting element. In particular, by means of the invention, a composite cutting body for the abrasive processing of hard materials or substrates, for example of concrete, is created, which comprises diamond particles embedded in a matrix of predominantly a metallic binder. The grain size of the diamond particles used is smaller than the grain size of the composite cutting bodies and is larger than 50 μm and smaller than 300 μm. Each composite cutting body is agglomerated and sintered in an individual molding process from a mixture of diamond particles and binder and has a grain size, which is about 400 μm to about 1200 μm.

Since each composite cutting body is produced in an individual molding process from the mixture of diamond particles and binder, the grain size and the shape of the composite cutting bodies can to some extent be controlled and the production process is largely reproducible. The composite cutting bodies, so produced, have a very narrow grain size distribution and resemble one another in their geometric shape. As a rule, therefore, all composite cutting bodies produced can be processed further. The grain size of the composite cutting bodies of about 400 μm to about 1200 μm corresponds largely to the grain size of the diamond crystals commonly used for the further processing of cutting segments. The composite cutting bodies can therefore be embedded in the usual manner in the matrix material. Since the composite cutting bodies consist of a plurality of small diamond particles linked to one another, many edges are available for the abrasive processing of the substrate. As a result, a rounding of individual edges, a fracture or a loss of a diamond particle has only an insignificant effect on the abrasive properties of the composite cutting body. The grain size of the diamond particles is larger than 50 μm and smaller than 300 μm. Understandably, fine grained diamond particles are used for composite cutting bodies of smaller grain size and the larger diamond particles are used for the larger composite cutting bodies. Not only are the diamond particles of smaller grain size less expensive than the larger single diamond crystals normally used, the diamond particles of smaller grain size usually also have fewer defects. As a result, the individual diamond particles have mechanical properties, which are better than those of single diamond crystals of larger grain size. This advantage is also transferred to the mechanical properties of the composite cutting bodies. The composite cutting bodies are produced directly without the process of breaking a sinter cake and a subsequent screening process. The omission of the additional processing steps simplifies the process of producing composite cutting bodies and makes them less expensive. In addition, the danger of mechanical damage to the composite cutting bodies is thus eliminated.

The composite cutting body of binder and small diamond particles has adequate strength and good bonding properties, if the binder comprises an alloy based on nickel or cobalt, to which silicon and/or boron and surface-active elements, such as chromium, have been added. Silicon and boron are added to lower the melting point. Chromium is a surface-active element, which ensures permanent chemical bonding of the diamond particles by way of a carbide formation.

Particularly good hardness properties and, at the same time, very good bonding properties are attained if the predominantly metallic binder alloy contains 1% to 25% chromium, 2% to 6% silicon, 0.5% to 4% boron and 50% to 95% nickel. The percentages are based in each case on the total weight of the alloy. Any remainder is made up by other binder alloy components, such as iron or cobalt.

Since the concentration by volume of diamond particles is about 20% to about 80% and preferably about 30% to about 70% of the volume of the agglomerated composite cutting body, a large number of cutting edges is available. Even if individual edges are rounded off or whole diamond particles are lost from the composite during use, sufficient diamond particles are still present at all times so that the cutting performance of the composite cutting body is affected only insignificantly.

The agglomeration of the mixture of diamond particles and binder takes place with the help of pasty carrier in the cavities of a mask. The mask may be an expandable molded object of plastic, such as silicone rubber, from which the mixture, after a drying step at moderate temperatures, at which the organic binder is expelled, is demolded once again before it is sintered. Preferably, the agglomeration and sintering take place in a rigid mask of ceramic, which is not wetted by the predominantly metallic binder alloy. In this case, the demolding is particularly simple and is accomplished simply by emptying the mask. Suitable ceramic materials are, for example, aluminum oxide, zirconium oxide or hexagonal boron nitride. When ceramic masks are used for the sintering process, for which at least the solidus temperature of the metallic binder is reached, the predried mixture can remain in the cavities of the mask. Metallic masks can also be used. In this case, after the agglomeration and sintering, the mask remains as a component of the composite cutting body and provides it with additional strength.

The composite cutting bodies can be mounted in the usual manner directly on the grinding disks or the like in that they are, for example, embedded in a synthetic resin coating of the surface of the grinding disk. In an advantageous application of the invention, the composite cutting bodies are processed further into abrasive cutting elements, which are hot-pressed directly with one another. The hot pressing process takes place at a pressure of about 5 to 50 MPa. The temperature is about 700° to about 1000° C.

The particular advantage of the composite cutting bodies of diamond grains of small grain size and binder consist therein that they can be processed further in the usual manner into diamond segments. In the further processing, the composite cutting bodies do not differ from previously used single diamond crystals of similar grain size. The composite cutting bodies are embedded in a predominantly metallic matrix material, which is softer than the predominantly metallic binder of the composite cutting bodies. The diamond segments, so constructed, have the advantage that they are self-sharpening from two points of view. On the one hand, during use of the diamond segments, the softer matrix material is worn away and new fresh composite cutting bodies constantly come to the surface once again. On the other hand, self-sharpening also takes place in the composite cutting bodies themselves, in that also the harder binder of the composite cutting bodies is worn away to some extent and new small diamond particles constantly reach the surface of the composite cutting body and, with their edges, become effective cutting elements there.

The inventive method for producing composite cutting bodies for the abrasive processing of hard materials or substrates, such as concrete, for which a mixture of diamond particles having a grain size, which is smaller than the grain size of the composite cutting bodies, and predominantly metallic binder is agglomerated to a composite and sintered, is distinguished owing to the fact that diamond particles are selected, the grain size of which is larger than about 50 μm and smaller than about 300 μm, and in that the mixture of diamond particles and binder in each case is molded in an individual molding process to a composite cutting body with a grain size of about 400 μm to about 1200 μm and sintered. The composite cutting bodies need no longer be dried and subsequently screened; instead, they have the desired grain size already after the individual molding process. Practically 100% of composite cutting bodies, so produced, are available for further processing. There is no waste, which does not have the desired grain size. Due to the individual molding process, the shape of the composite cutting bodies produced can largely be controlled; this facilitates further processing.

The inventive, individual molding process consists therein that the mixture of diamond grains and binders for molding is brought by means of a pasty carrier into the individual cavities of masks of ceramic or flexible plastic, preferably silicone rubber, the organic portion of the binder is driven off by a temperature treatment and the pretreated mixture is vacuum sintered at a temperature of about 900° C. to about 1300° C. If the masks are of a ceramic or a metal, the mixture remains in the cavities or is transferred to a ceramic plate or a corundum bed for the sintering process. For sintering on a corundum bed, the composite cutting bodies are separated from the corundum particles by screening. In the case of a ceramic mask, the composite cutting bodies can simply be emptied out. In the case of a metallic mask, the latter subsequently forms a component of the composite cutting grain, reinforcing its structure.

As metallic binder, an alloy, based on nickel or cobalt, is selected and silicon and/or boron and/or surface-active elements, such as chromium, are added. The composition of the binder alloy is 1% to 25% chromium, 2% to 6% silicon, 0.5% to 4% boron and 50% to 95% nickel. The percentages in each case refer to the total weight of the alloy. Any remainder is made up of binder alloy components, such as iron or cobalt. In this connection, the volume concentration of the diamond particles is selected to be about 20% to about 80% and preferably about 30% to about 70% of the volume of the agglomerated composite cutting body. With the composition selected and the high proportion of diamond particles, composite cutting bodies can be produced, which have a sufficiently high mechanical strength and the desired good cutting properties.

Figure 2:
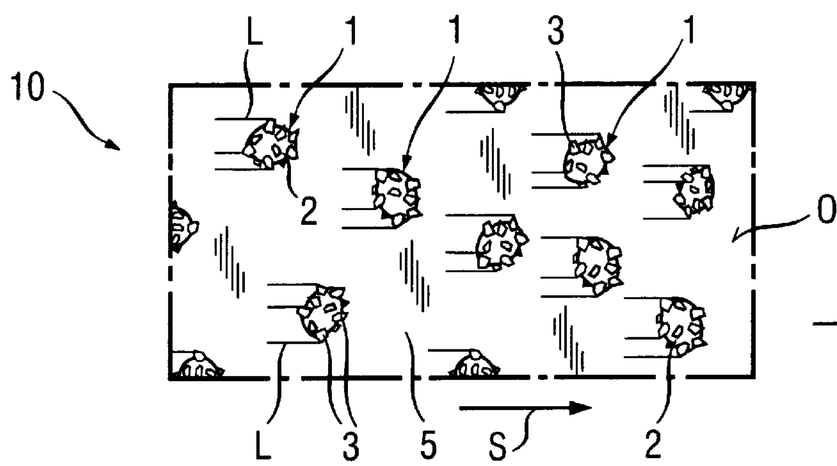
Figure 3:
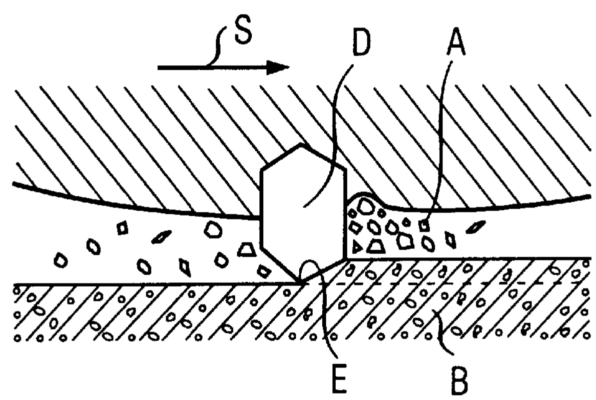
Figure 4:
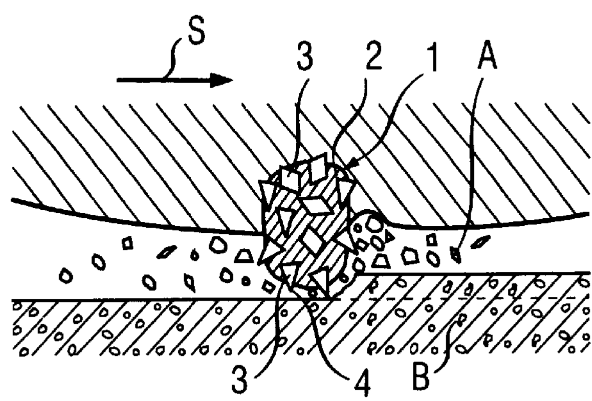

In the following, the invention is explained in greater detail with reference to the diagrammatic representations, which are not drawn to scale. In the drawings, FIG. 1 shows a view of a composite cutting grain, FIG. 2 shows a view of the cutting end surface of a diamond segment, FIG. 3 shows a representation to illustrate the cutting process with a conventional diamond segment and FIG. 4 shows a representation to illustrate the cutting process with an inventive diamond segment with composite cutting bodies.

The inventive composite cutting body in FIG. 1 is labeled, as a whole, with the reference symbol 1. It comprises a plurality of diamond particles 3, which are embedded in a predominantly metallic binder 2. The diamond particles 3 have a grain size, which is larger than 50 $\mu$m and smaller than 300 $\mu$m, and are agglomerated and sintered in an individual molding process to composite cutting bodies 1 with a grain size of about 400 $\mu$m to about 1200 $\mu$m. The diamond particles, embedded in the vicinity of the surface in the predominantly metallic binder 2 protrude with their edges 4 from the surface of the composite cutting body 1.

The predominantly metallic binder 2 comprises an alloy based on nickel or cobalt, with addition of silicon and/or boron and surface-active elements, such as chromium. Silicon and boron are added in order to lower the melting point for the sintering process. Chromium is a surface-active element, which ensures permanent chemical bonding of the diamond particles by way of carbide formation. The predominantly metallic binder preferably consists of an alloy of 1% to 25% chromium, 2% to 6% silicon, 0.5% to 4% boron and 50% to 95% nickel. The percentages in each case refer to the total weight of the alloy. Any remainder is made up of other alloying components, such as iron or cobalt. The average grain size of the binder is about 5 $\mu$m to about 100 $\mu$m; preferably, it is smaller than 20 $\mu$m.

Before it is mixed with the diamond particles, the binder is brought in a build-up granulation step to a grain size, which is comparable with the size of the diamond particles. This improves the uniform mixing of the individual components of the composite cutting body 1. To produce the composite cutting body 1, the mixture of diamond particles 3 and binder 2 is brought into the cavities of a mask by means of a pasty carrier, such as waxes and alcohols with rheological components, which are intended to prevent demixing. The mask can be a rigid formation, for example, of ceramic or metal. It may also consist of an expandable molded object of a plastic, such as silicone rubber. After a drying step, during which the organic portion of the binder is driven out at moderate temperatures of about 50° to about 70° C., a vacuum sintering process follows, during which at least the solidus temperature of the predominantly metallic binder 2 is reached. The sintering temperatures used typically are of the order of about 900° to about 1300° C. If the drying step was carried out in a ceramic or a metallic mask, the predried mixture can remain in the mask for the vacuum sintering process. Subsequently, if a suitable material is selected for the metallic mask, the sintered composite cutting body 1 need not even be demolded; instead, the mask can remain a component of the composite cutting body 1. Aside from the advantage that the demolding step is dropped, the metallic mask represents an additional structure-giving distinguishing feature of the composite cutting body.

If the mixing and drying take place in a flexible mask of plastic, such as silicone rubber, the predried mixture is taken from the mold before the vacuum sintering process is carried out. Because of the high extensibility of the plastic mold, easy demoldability is ensured. The stability of the predried mixture is sufficient to ensure safe further handling. For the sintering process, the mixture is placed on a ceramic plate, for example, of aluminum oxide, or on a corundum bed. After the vacuum sintering, the composite cutting bodies 1 can be separated from the corundum grains by screening.

The individual molding process has the advantage that the size and shape of the composite cutting bodies 1 can be adjusted and largely controlled. The composite cutting bodies 1, so produced, accordingly have in their totality the desired grain size and shape. They can be used directly as abrasive cutting bodies, for example, in that they are embedded directly in a synthetic resin coating of a grinding disk. However, the inventive composite cutting bodies 1 can also be combined into larger abrasive cutting elements. For this purpose, the composite cutting bodies 1 are bonded to one another, for example, in a hot pressing process, in which pressures of about 5 MPa to about 50 MPa occur. The processing temperatures are of the order of about 700° C. to about 1000° C. During the hot pressing process, the predominantly metallic binder of the individual composite cutting bodies 1 is fused together and an amorphous cutting element is produced in the desired shape. The edges 4 of the diamond particles 3, which are close to the surface, protrude from the surface of the cutting element Provided that they can be demolded, the amorphous cutting elements can be produced in any shape.

In a particularly advantageous application of the composite cutting bodies 1, the latter are processed further in the usual manner, like single diamond crystals of larger grain size, to diamond segments for drilling crowns, cutting-off wheels, wall saws and the like. A cutout of such a diamond segment is shown in FIG. 2 and labeled 10 as a whole. The diamond segment 10 comprises a number of composite cutting bodies 1, which are embedded in a metallic matrix material 5. The metallic matrix material 5 is softer than the predominantly metallic binder 2 of the composite cutting bodies 1. An example of a suitable matrix material 5 is described in U.S. Pat. No. 5,186,724, which corresponds to EP-B-0 481 917, the content of which is herewith declared to be an integral part of the present patent application. The concentration of the composite cutting bodies 1 corresponds largely to the concentration of single diamond crystals of larger grain size in conventional diamond cutting segments. It is about 5% to about 40%, based on the volume of the diamond cutting segments 10.

The diamond particles 3 of the composite cutting body 1, which are close to the surface, protrude from the surface O of the diamond cutting segment 10 and form a plurality of cutting edges, the cutting traces of which in the segment are indicated by lines L in FIG. 2. The processing direction is indicated by the arrow S.

FIGS. 3 and 4 illustrate the cutting process with a conventional cutting segment (FIG. 3) and with a cutting segment 10 with inventive composite cutting bodies 1 (FIG. 4). The arrow S in each case indicates the processing direction. FIG. 3 shows an edge E of a single diamond crystal D, which comes into contact with the substrate B during abrasive processing and abrades material A. On the other hand, the composite cutting body 1, which is of the same size, has a plurality of edges 4, which protrude from the surface of the binder 2 and belong to small diamond particles 3, which are close to the surface. Instead of only one edge E of a single diamond crystal D in engagement with the substrate B (FIG. 3), the substrate is processed with a plurality of edges 4, all of which contribute to the excavation of the material A. If the processing edge E of the cutting segment of FIG. 3 becomes blunt or if the single diamond crystal D falls from the diamond segment, this cutting edge as a whole fails to process abrasively, until sufficient matrix material has been excavated from the diamond cutting segment, so that a new single diamond crystal D protrudes from the surface of the diamond cutting segment. In the case of a inventive diamond cutting segment, a series of edges 4 of the composite cutting body 1 engage the substrate B. If one edge 4 should become blunt or if one diamond particle 3 should break or is lost, then the effect is only insignificant, since sufficient further edges 4 are available. It is also not necessary to excavate a large amount of matrix material of the diamond cutting segment before the ineffective or lost edge 4 is replaced. It is only necessary to wear away a slight amount of binder of the composite cutting body 1, before a new diamond particle 3 is exposed, the edges 4 of which contribute to the excavation of material A. This self-sharpening effect is superimposed on the usual sharpening effect, by means of which new composite cutting bodies 1 are exposed in the matrix material of the diamond cutting segment. The inventive diamond cutting segment thus is doubly self-sharpening.

What is claimed is:

1. A composite cutting element for use in the abrasive processing of hard materials and substrates, said cutting element being in the size range of about 400 μm to about 1200 μm and comprising a mixture of diamond particles having a grain size in the range of between 50 μm and 300 μm and a matrix of metallic binder, the mixture of each composite cutting element is agglomerated and subsequently sintered in an individual molding process , and the agglomerated composite cutting element comprises said diamond particles in a range of 20%–80% by volume of the total volume of said cutting element.

2. The composite cutting element of claim 1 wherein the binder is a nickel alloy with the addition of at least one of silicon and boron, and a surface active element for promoting the formation of carbide binding of the matrix with the surface of the diamond particles.

3. The composite cutting element of claim 1 wherein the binder is a cobalt alloy with the addition of at least one of silicon and boron, and a surface active element for promoting the formation of carbide binding of the matrix with the surface of the diamond particles.

4. The composite cutting element of claim 2 or 3 wherein said surface active element is chromium.

5. The composite cutting element of claim 2 or 3 wherein the binder contains, by weight, 1% to 25% chromium, 2% to 6% silicon, 0.5% to 4% boron and 50% to 95% nickel, with the balance comprising at least one of iron and cobalt.

6. The composite cutting element of claim 1 wherein the agglomeration of the mixture of diamond particles and binder is carried out in a ceramic mask.

7. The composite cutting element of claim 6 wherein the ceramic mask comprises a compound selected from the group consisting of aluminum oxide, zirconium oxide and hexagonal boron nitride.

8. An abrasive cutting material comprises a plurality of composite cutting elements in the size range of about 400 μm to about 1200 μm, said cutting elements comprise a mixture of diamond particles have a grain size in the range of between 50 μm and 300 μm and a matrix of metallic binder, the mixture of each said cutting elements being agglomerated and subsequently sintered each in an individual molding process and then the sintered composite cutting elements are pressed together at an elevated temperature in the range of about 700° to about 1,000° C.

9. A diamond cutting segment comprises a plurality of composite cutting elements in the size range of about 400 μm to about 1200 μm, said cutting elements comprise a mixture of diamond particles having a grain size in the range of between 50 μm and 300 μm and a matrix of metallic binder, the mixture of each said cutting element being agglomerated and subsequently sintered each in an individual molding process and then the sintered composite cutting elements are embedded in a matrix material softer than the metallic binder of the composite cutting elements.

10. A method of producing composite cutting elements for abrasive processing of hard materials and substrates comprising a mixture of diamond particles in the size range of between 50 μm and 300 μm and a metallic binder, comprising the steps of mixing the diamond particles and metallic binder and agglomerating the mixture into individual composite cutting elements, molding the agglomerated mixture of each composite in an individual molding process with the composite cutting element being in a size range of about 400 μm to about 1200 μm, and then sintering the molded composite cutting element.

11. A method of producing composite cutting elements as set forth in claim 10 comprising the further step of placing the mixture of diamond particles and metallic binder of a composite cutting element into individual cavities of a mask, said mask being formed of a material selected from the group consisting of flexible rubber, ceramic and metal.

12. A method as set forth in claim 10 wherein the metallic binder has an organic portion, and comprising the further step of driving off the organic portion of the binder in a temperature treatment and vacuum sintering the pre-heated mixture at a temperature in the range of about 900° C. to 1,300° C.

13. A method is set forth in claim 10, wherein the metallic binder comprises an alloy of cobalt with at least one element selected from the group consisting of chromium, silicon and boron.

14. A method of claim 10 wherein the metallic binder is an alloy of nickel and to which is added one or more of the elements chosen from the group consisting of chromium, silicon and boron.

15. A method of claim 13 wherein the binder contains, by weight, 1% to 25% chromium, 2% to 6% silicon, 0.5% to 4% boron and 50% to 95% nickel, with the balance comprising at least one of iron and cobalt.

16. The method of claim 13 wherein the binder contains, by weight, 1% to 25% chromium, 2% to 6% silicon, 0.5% to 4% boron and 50% to 95% nickel, with the balance comprising at least one of iron and cobalt.

* * * * *